United States Patent

[11] 3,611,091

[72] Inventor Salvatore Genovese
3744 S. Gunderson, Berwyn, Ill. 60402
[21] Appl. No. 851,544
[22] Filed Aug. 20, 1969
[45] Patented Oct. 5, 1971

[54] DC MOTOR WILL PLURAL BATTERY SUPPLY
6 Claims, 2 Drawing Figs.
[52] U.S. Cl. .................................................... 318/248,
318/500, 320/14, 320/19, 320/21
[51] Int. Cl. ...................................................... H02p 7/20
[50] Field of Search ........................................... 318/248,
500; 320/14, 16, 19, 21

[56] References Cited
UNITED STATES PATENTS
1,291,233   1/1919   Storer ........................... 318/248 X Primary Examiner—Oris L. Rader
Assistant Examiner—H. Huberfeld
Attorney—Hill, Sherman, Meroni, Gross & Simpson ABSTRACT: A direct current electric motor system employs a controlled energizing circuit having a plurality of sources of direct current, one of which is connected with alternate ones of the other sources to energize the stator winding while the other of the alternately connected sources is simultaneously placed in a charging circuit. The motor comprises a plurality of stators and a corresponding plurality of rotors with the rotors mounted on the common shaft and angularly disposed relative one another so that there is a time overlap in their periods of influence by their corresponding stator field windings.

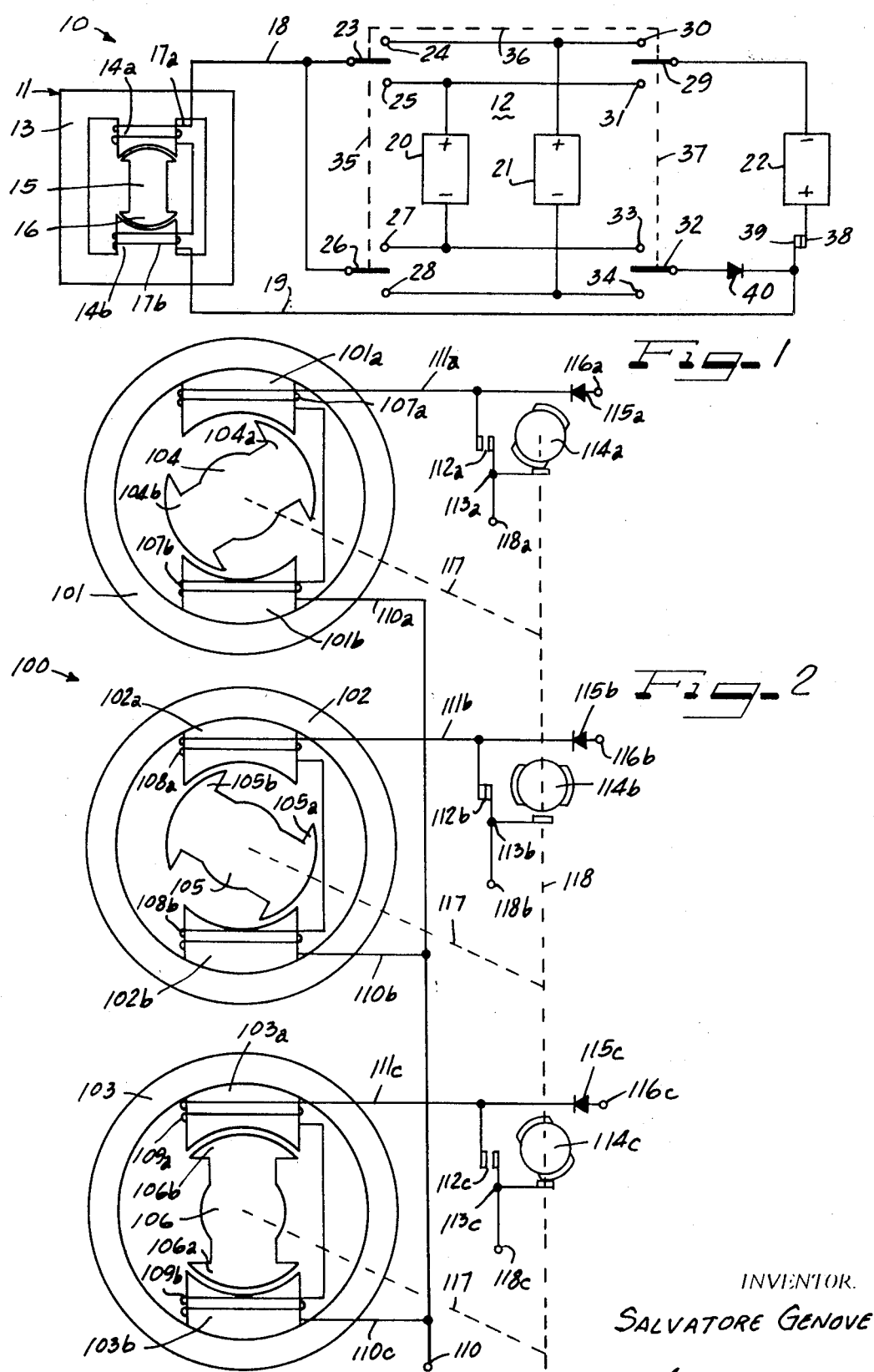

3,611,091

DC MOTOR WILL PLURAL BATTERY SUPPLY

BACKGROUND OF THE INVENTION

1. Field of the Invention

This invention relates to direct current motor systems and more particularly to systems for increasing the efficiency of direct current motors by switching connections of the sources so that current is only consumed during the portions of the revolution of the rotors with respect to their stator windings, and by utilizing the energy given up by the collapsing magnetic fields to return energy to the powering sources.

2. Description of the Prior Art

The utilization of battery charging apparatus in conjunction with the operation of a direct current motor is known in the art. Similar apparatus is also known for providing a charge buildup on a capacitor in connection with both AC and DC motor-generator apparatus. However, such systems are relatively inefficient from a total system standpoint in that battery charging is only incidental, and not of major concern, to the overall operation of the system.

SUMMARY OF THE INVENTION

According to the present invention, a direct current electric motor system is provided which employs a plurality of batteries for motor energization and means for alternately switching a pair of batteries between a discharge circuit for operating the motor and a charging circuit for receiving energy therefrom. The pair of batteries is alternately switched in series with the third battery for energizing the stator windings of a direct current motor, while the other of the pair of batteries is simultaneously placed in a charging circuit which is effective to absorb energy from the stator windings during an open circuit condition of the established energizing circuit by way of commutator contacts or cam-operated contacts.

A plurality of stators and their associated stator windings and rotors are provided in one exemplary embodiment of the invention, the rotors being fixed to a common shaft and angularly disposed with respect to one another so that some of these stator circuits will be operating in an energy consumption condition while other stator circuits are operating in charging condition, the rotors being so disposed and commutator contacts for effecting the switching being so arranged that there is a time overlap in the energization conditions from one stator to the next.

BRIEF DESCRIPTION OF THE DRAWINGS

Other objects, features and advantages of the invention will be readily apparent from the following description of certain preferred embodiments thereof, taken in conjunction with the accompanying drawing, although variations and modifications may be effected without departing from the spirit and scope of the novel concepts of the disclosure, and in which:

FIG. 1 is a schematic representation of a two-pole direct current motor and its associated energizing circuit according to the principles of the present invention; and FIG. 2 is a schematic representation of a two-pole direct current motor system having a plurality of stators and rotors which are operable in accordance with the energizing and charging principles of the present invention.

DESCRIPTION OF THE PREFERRED EMBODIMENT

In the drawings, a direct current motor system is generally shown at 10 as comprising a direct current motor 11 which is connected to an energizing circuit 12.

The motor 11 comprises a stator 13, preferably of a laminated construction, including a pair of pole members 14a and 14b each of which has an arcuate end for receiving corresponding arcuate ends 16 of a rotor 15. A pair of serially connected windings 17 a and 17b are disposed on respective ones of the pole members 14a and 14b and are electrically extended over leads 18 and 19 to the energizing circuit 12.

The energizing circuit 12 comprises a plurality of batteries 20, 21 and 22, of which batteries 20 and 21 are alternately connectable in series with battery 22 for energizing the windings 17a and 17b of motor 11 while the other of batteries 20 and 21 is connected in a charging circuit.

The aforementioned connections may be effected by a plurality of transfer-type switching contacts, preferably in the form of commutator apparatus, as illustrated by elements 23-37. The switching apparatus comprises a contact 23 as an extension of conductor 18 for selective connection to contacts 24 and 25, and accordingly the positive poles of batteries 20 and 21. Another extension of conductor 18, contact 26, is connectable to contacts 27 and 28, and accordingly to the negative poles of batteries 20 and 21.

The battery 22 has its negative pole connectable to the positive pole of either battery 20 or battery 21 by way of contact 29 and contacts 30 and 31. The positive pole of the battery 22 is connected to conductor 19 and the serially connected winding 17a and 17b of the motor 11 by way of contacts 38 and 39. The conductor 19 and the stator windings 17a and 17b are also connectable to the negative poles of batteries 20 and 21 by way of switch contacts 32, 33 and 34, and also by way of a diode 40. The switch mechanism operates in such a manner that in a first position wiper contacts 26, 23, 29, and 32 engage contacts 27, 24, 31, and 34 respectively and in a second position the wiper contacts engage contacts 28, 25, 30, and 33 respectively.

Thus switch contacts 26, 27 and 28 and switch contacts 29 30 and 31 are effective to alternately connect the batteries 20 and 21 in series with the battery 22 and the windings 17a and 17b during the close condition of contacts 38 and 39. At the same time, contacts 23, 24 and 25, and contacts 32, 33 and 34 are effective to place the other of batteries 20 and 21 in a series circuit with the winding 17a and 17b and diode 40. This circuit is effective upon the operation of contacts 38 and 39, and the attendant deenergization of winding 17a and 17b, to provide a charging circuit for the particular battery 20 or 21 then in circuit, to receive the current of the collapsing magnetic field of windings 17a and 17b.

The contacts 23, 26, 29 and 32 operated alternately between their upper and lower corresponding contacts so as to continuously switch the batteries 20 and 21 between energy delivering and energy receiving conditions.

Referring now to FIG. 2, a direct current motor system 100 is illustrated as comprising a plurality of stators 101, 102 and 103 including corresponding pairs of pole members 101a-101b, 102a-102b and 103a-103b. Secured for rotation on a common shaft, indicated by mechanical linkage 117, are a plurality of rotors 104, 105, and 106 having respective arcuate shaped ends 104a-104b, 105a-105b and 106a-106b. Each of these rotors is angularly disposed with respect to the other rotors, as indicated by the positions of, for example, ends 104a, 105a and 106a, so that as the magnetic field provided to the respective windings 107a-107b, 108a-108b and 109a-109b may be effective as the corresponding rotor is adjacent the pole members.

More specifically, the stator windings are connected on the one hand by way of conductors 110a, 110b and 110c to a terminal 110 which corresponds to conductor 18 of FIG. 1, while conductors 111a, 111b and 111c extend from the other respective stator winding through a plurality of contacts 112a, 112b and 112c, respectively, to terminals 118a, 118b and 118c, which correspond to the positive terminal of battery 22 of FIG. 1. Contacts 112a, 112b and 112c are operated by respective cam wheels 114a, 114b and 114c in the illustrated example to pivotally operate one of the contacts about a pivot point 113a, 113b and 113c. Although cam wheels are shown for operating the contacts, other commutator apparatus, such as brush contacts provide satisfactory operation.

It is readily apparent from the apparatus illustrated in FIG. 2 that when connected to an energizing circuit such as illustrated in FIG. 1, batteries 20 and 21 are alternately connected in circuit with battery 22 to energize the windings by way of terminal 110 and that the rotors are angularly disposed on a common shaft and the contacts 112 are timed to operate such that the individual winding circuits are opened and the current from the individual collapsing magnetic fields are steered by way of diodes 115, such as was the case with diode 40, to charge the other of the alternately connected batteries. In this manner, more efficient use of current is obtained by practicing the present invention.

It should be noted that although two-pole machines have been illustrated, the invention is also applicable to other multipole configurations. I have found that a four-pole motor constructed according to my invention can provide a greater amount of output power per unit weight than is presently found in conventional motors. Also, a wound rotor may be employed rather than the rotating iron rotor illustrated herein. Attention is also invited that although contacts have been illustrated herein as transfer switches and as cam-operated switches, brush-type commutator apparatus may be satisfactorily employed in practicing the present invention.

What I claim is:

1. A direct current motor system comprising:
   a motor including a stator having at least one pair of pole members, a rotor mounted for rotation within said stator, and a pair stator windings permanently serially connected and individually disposed on separate ones of said pole members,
   first, second and third sources of direct current for energizing said stator windings,
   first switching means for connecting said first and alternately one of said second and third sources to said stator windings,
   diode means,
   second switching means for alternately connecting the other of said second and third sources and said diode means to said windings in an opposite polarity sense to the connection of said first source, and
   third switching means for interrupting the circuit established by said first switching means to effect a changing relationship between said windings and said alternately connected other source of direct current.

2. A direct current motor system as set forth in claim 1, wherein said first, second and third sources of direct current are batteries.

3. A direct current motor system according to claim 1, comprising commutator switch means including said first and second switching means.

4. A direct current motor system according to claim 1, wherein said third switching means comprises a commutator for momentarily opening the circuit established by said first switching means.

5. A direct current motor system according to claim 1, comprising
   a plurality of other stators each of which has at least one pair of pole members,
   a plurality of other rotors individually associated with said other stators, all of said rotors mounted for mutual rotation and angularly displaced from one another,
   a plurality of pairs of other windings permanently serially connected and disposed on separate pairs of said pole members of said other stators and connected to said first and second switching means, and
   a plurality of other diode means each of said other diode means associated with a separate pair of said other windings, each of said diode means connecting its associated pair of windings to said second switching means, and
   wherein said third switching means includes a plurality of contacts each of which is connected between a separate pair of said stator windings and said first source of direct current, whereby said pairs of windings are energized out of phase with one another and deliver charging current to said other alternately connected source out of phase with one another.

6. A direct current motor system according to claim 5, comprising a shaft commonly mounting all of said rotors, said rotors being angularly displaced on said shaft with respect to one another.